US008434219B2

(12) United States Patent
Dierks et al.

(10) Patent No.: US 8,434,219 B2
(45) Date of Patent: May 7, 2013

(54) CRIMPING TOOL

(75) Inventors: Christoph Dierks, Dortmund (DE); Thilo Broeker, Dortmund (DE)

(73) Assignee: Weidmueller Interface GmbH & Co., KG, Detmold (DE)

( * ) Notice: Subject to any disclaimer, the term of this patent is extended or adjusted under 35 U.S.C. 154(b) by 267 days.

(21) Appl. No.: 13/122,386

(22) PCT Filed: Sep. 16, 2009

(86) PCT No.: PCT/EP2009/061992
§ 371 (c)(1),
(2), (4) Date: Apr. 1, 2011

(87) PCT Pub. No.: WO2010/040622
PCT Pub. Date: Apr. 15, 2010

(65) Prior Publication Data

US 2011/0173802 A1 Jul. 21, 2011

(30) Foreign Application Priority Data

Oct. 10, 2008 (DE) ..................... 20 2008 013 411 U

(51) Int. Cl.
*B23P 19/00* (2006.01)
*H01R 43/042* (2006.01)

(52) U.S. Cl.
USPC ................. 29/753; 29/33 M; 29/748; 29/751; 29/761; 29/788; 72/416; 72/453.01; 72/456

(58) Field of Classification Search .................... 29/753, 29/33 M, 283.5, 748, 750, 751, 758, 761, 29/788, 796, 857, 863; 72/402, 409.16, 416, 72/453.01, 453.16, 456
See application file for complete search history.

(56) References Cited

U.S. PATENT DOCUMENTS

| | | | | |
|---|---|---|---|---|
| 3,469,434 | A | 9/1969 | Davis | |
| 5,335,530 | A * | 8/1994 | Homm | 72/402 |
| 6,138,346 | A | 10/2000 | Shutts | |
| 6,532,790 | B2 * | 3/2003 | Frenken | 72/456 |
| 6,769,173 | B2 * | 8/2004 | Chadbourne | 29/761 |

FOREIGN PATENT DOCUMENTS

| | | | |
|---|---|---|---|
| EP | 1094571 | A2 | 4/2001 |
| EP | 1406358 | A1 | 4/2004 |
| FR | 2644383 | A1 | 9/1990 |
| JP | 0650660 | B2 | 2/1994 |
| JP | 2001315069 | A | 11/2001 |
| WO | 2004082878 | A1 | 3/2004 |

* cited by examiner

*Primary Examiner* — Thiem Phan

(74) *Attorney, Agent, or Firm* — Lawrence E. Laubscher, Sr.; Lawrence E. Laubscher, Jr.

(57) ABSTRACT

A crimping tool for crimping an electrical contact toward engagement with an electrical conductor, including a housing, a pair of crimping dies, a die support arrangement supporting a first one of the crimping dies in a stationary position on said housing, and a displacing mechanism for displacing the other crimping die between open and closed positions relative to the stationary crimping die. The displacing mechanism includes a rotary drive shaft, a crimping arm having a first end portion connected with the movable crimping die member, and a rotary-to-reciprocatory motion converting mechanism adjacent the other end of the crimping arm for transforming the rotary motion of the drive shaft to a reciprocatory motion of the crimping arm, thereby to displace the movable crimping die between the open and closed positions.

16 Claims, 8 Drawing Sheets

CRIMPING TOOL

REFERENCE TO RELATED APPLICATIONS

This application is a national stage under 35 U.S.C. 371 of PCT International Application No. PCT/EP2009/061992 filed Sep. 16, 2009, which is based on the German priority application No. 20 2008 013 411.0 filed Oct. 10, 2008. It is also related to the companion Broeker et al U.S. application Ser. No. 13/061,152 filed Feb. 27, 2011.

BACKGROUND OF THE INVENTION

1. Field of the Invention

A crimping tool for crimping an electrical contact toward engagement with an electrical conductor, including a housing, a pair of crimping dies, a die support arrangement supporting a first one of the crimping dies in a stationary position on said housing, and a displacing mechanism for displacing the other crimping die between open and closed positions relative to the stationary crimping die. The displacing mechanism includes a rotary drive shaft, a crimping arm, and a rotary-to-reciprocatory motion converting mechanism for transforming the rotary motion of the drive shaft to a reciprocatory motion of the crimping arm.

2. Description of Related Art

The state of the art reveals manually controlled crimping tools in the form of crimping pliers-type tools, where in order to press terminals, connectors or contacts onto electrical conductors, the two handles of the tool must be pressed together manually. Repeated use of such a crimping tool is very tiring for the hand of a user, so that in case of continuous use, the user, after several crimping functions, is no longer able to work the crimping pincers.

The object of the present invention therefore is to provide a crimping tool that will make it possible to press cable lugs or cable connectors without getting tired.

SUMMARY OF THE INVENTION

Accordingly, a primary object of the present invention is to provide a crimping tool for crimping an electrical contact toward engagement with an electrical conductor, including a housing, a pair of crimping dies, a die support arrangement supporting a first one of the crimping dies in a stationary position on said housing, and a displacing mechanism for displacing the other crimping die between open and closed positions relative to the stationary crimping die, said displacing mechanism including a rotary drive shaft, a crimping arm, and a rotary-to-reciprocatory motion converting mechanism for transforming the rotary motion of the drive shaft to a reciprocatory motion of the crimping arm. The drive shaft is adapted to be driven by an electric drill that is connected with the crimping tool by a support sleeve.

According to a more specific object of the invention, the crimping arm is longitudinally displaced in the crimping direction by a ratchet wheel that is driven in given direction in a step-by-step manner by the drive shaft via rotary-to-reciprocating motion converting means. In one embodiment, the motion concerting means includes a crank arm for reciprocating a transport pawl. The rotary motion of the ratchet wheel is transmitted to the crimping arm by an eyelet and eccentric cylinder arrangement. In a second embodiment, the motion converting means includes a reciprocating linear follower member that is engaged at one end by the circumferential surface of a cam that is driven by the drive shaft, the other end of the follower member being connected with the transport pawl. Here, the rotary motion of the ratchet wheel is transmitted to the crimping arm via a pressure follower member that engages the surface of a cam that is connected with the ratchet wheel.

According to another object of the invention, manually operable release means are provided for releasing the stationary crimping die from its stationary position relative to the housing, thereby to affording opening of the dies to clear a jam occurring during the crimping operation.

Another object is to provide a crimping tool that can be held and guided by the hands of a user, such as this is the case, for example, in the case of a manual electric drilling machine.

In the inventive crimping tool, a drive unit of the crimping tool has a drive shaft that is rotatably positioned around its longitudinal axis, which drive shaft can be driven by an electric motor. This electric motor supplies the force to be provided for the crimping procedure so that the hand of the user, as a result, is considerably relieved and only has to guide the crimping tool itself The drive shaft of the crimping tool can be clamped into a drill chuck of a drill connected with the electric motor in a final or a separable manner. In both cases, the user therefore has available an easily handled electric tool that in a simple manner and without any major effort can be operated or used by the user. In the latter case, it is furthermore advantageous that the user—for different working steps, for example, crimping of cable lugs and cutting cables—needs only one electrical tool, such as a manual drill or a storage battery-powered drill for employment at the corresponding yokes (crimping yoke, cutting yoke).

According to a special embodiment, the crimping tool has a rotary support relative to the sleeve that is connected with the drill. The latter in a particularly preferred manner is stuck on the adaptor flange of a drill and is fixed by means of a clamping ring. Handling is definitely simplified as a result of this firm connection between drive part and drill.

For the pressing motion required for a crimping use, the drive unit according to the invention has a transport catch that can be moved alternately in a reciprocatory manner, an eccentric wheel, and a crimping stamp. In particular, the crimping stamp is connected with the eccentric wheel by a connecting rod. In a simple manner, this facilitates a conversion of the translation movement of the transport catch into a rotary movement of the eccentric wheel, whereby the rotary motion of the eccentric wheel via the connecting rod is again converted into a translation movement of the crimping stamp.

The conversion of the rotary movement of the drive shaft into a translation movement of the transport catch is brought about either via a crank drive or a cam drive. The cam drive offers the advantage that one can distribute the required movement for the crimping process most extensively freely upon the circumference of a cam disk. In this way, the working stroke can be adapted to the individual requirements.

Preferably, the drive unit furthermore has a locking pawl that is pressed against the eccentric wheel by spring biasing means. This locking catch mechanism, in addition, prevents fast rotary movements of the eccentric wheel and makes it possible to guide the eccentric wheel in this fashion into the lower dead center of the drive mechanism in order then to be able to take out the cable lug with the crimp insert fully opened.

Preferably, a manually controlled unit is arranged on the eccentric wheel for the purpose of manually turning the eccentric wheel. That facilitates the fast opening and closing of the crimp insert.

In order to remove the terminals or connectors in a simple manner, or if the tool is not properly handled, the stationary crimping die can also be unlocked and opened when under load. For this purpose, the head unit is made with first and second support arms, whereby on the first support arm, there is rotatably positioned an eccentric bolt, which eccentrically is positioned on a tool housing part so that it can be rotated around a second pivotal point in such a manner that the first support arm can be moved parallel to the longitudinal axis of the first support arm away from the drive unit and so that, as a result, a locking action with the second support arm can be released. After unlocking, the support arms can be pivoted away laterally outwardly, and a connector that has been falsely inserted can then be taken out.

According to a preferred embodiment, the crimping insert is removably retained by the support arms. This makes it possible to exchange the crimping insert, and that, in turn, makes it possible to make crimping connections in differing forms and with differing cross-sections.

BRIEF DESCRIPTION OF THE DRAWINGS

Other objects and advantages of the invention will become apparent from a study of the following specification, when viewed in the light of the accompanying drawing, in which.

DETAILED DESCRIPTION OF THE INVENTION

In the following description of figures, terms such as top, bottom, left, right, front, rear, etc., refer exclusively to the exemplary illustration and position of the crimping tool as chosen for the particular figures. These concepts are not to be construed in any restrictive manner, in other words, these relationships can change in different working positions or as a result of the mirror symmetry design or the like.

Figure 1:
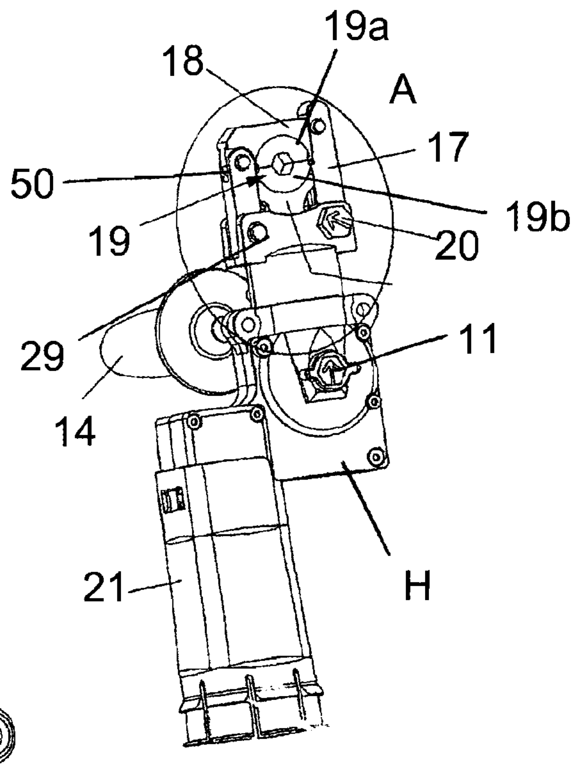
FIGS. 1 and 2 are front and rear perspective views, respectively, of the crimping tool of the present invention.
Figure 2:
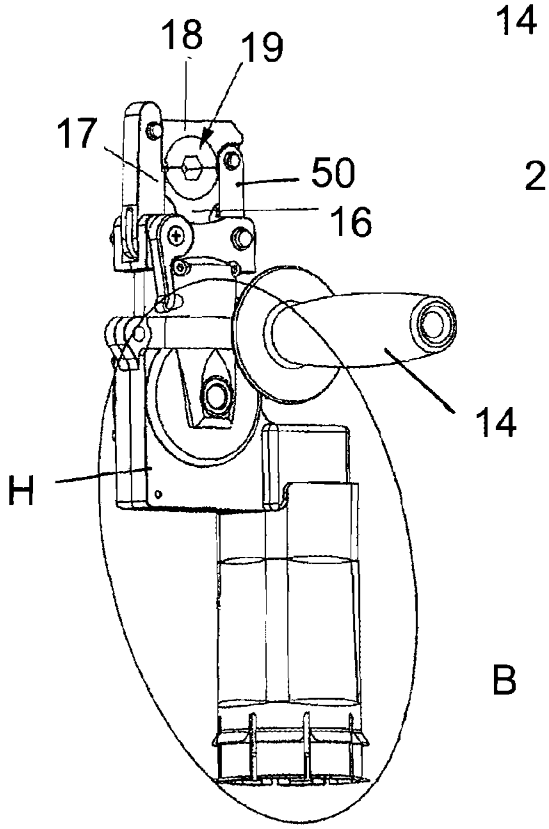

Referring first more particularly to FIGS. 1 and 2, the crimping tool of the present invention includes a housing H that is rotatably connected with a support sleeve 21 that is adapted for connection with an electric drill, as will be described in great detail below, a head unit A, and a drive unit B. Handle 14 connected with the housing permits controlled rotation of the housing relative to the sleeve. Crimping means 19 including a pair of crimping dies 19*a* and 19*b* are provided for crimping a terminal or connector T with a conductor C, as will be described below. A first one of the crimping dies 19*a* is supported at a stationary position on the housing by a pair of vertical spaced support arms 17 and 50, and a horizontal support arm that is connected between the upper ends of the vertical support arms. Manual activating means including a knob 11 are provided for manually operating the movable die member 19*b* toward its open position, and a release knob 20 provides means for opening the stationary crimping die 19*b* in the event of jamming of the crimping tool.

Figure 3:
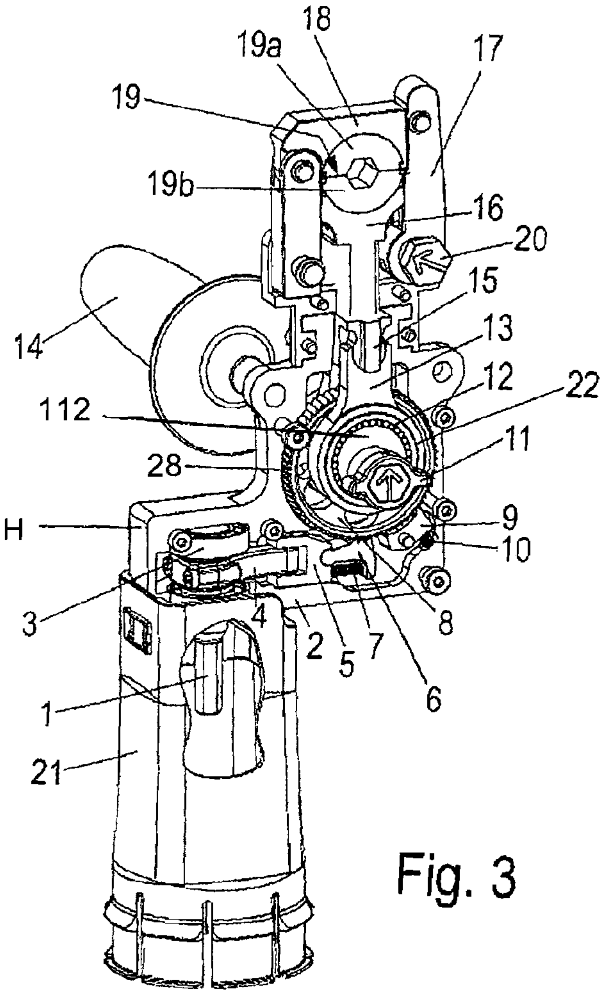
FIG. 3 is a front perspective view, with certain parts removed, of the crimping tool of FIG. 1.
Figure 4:
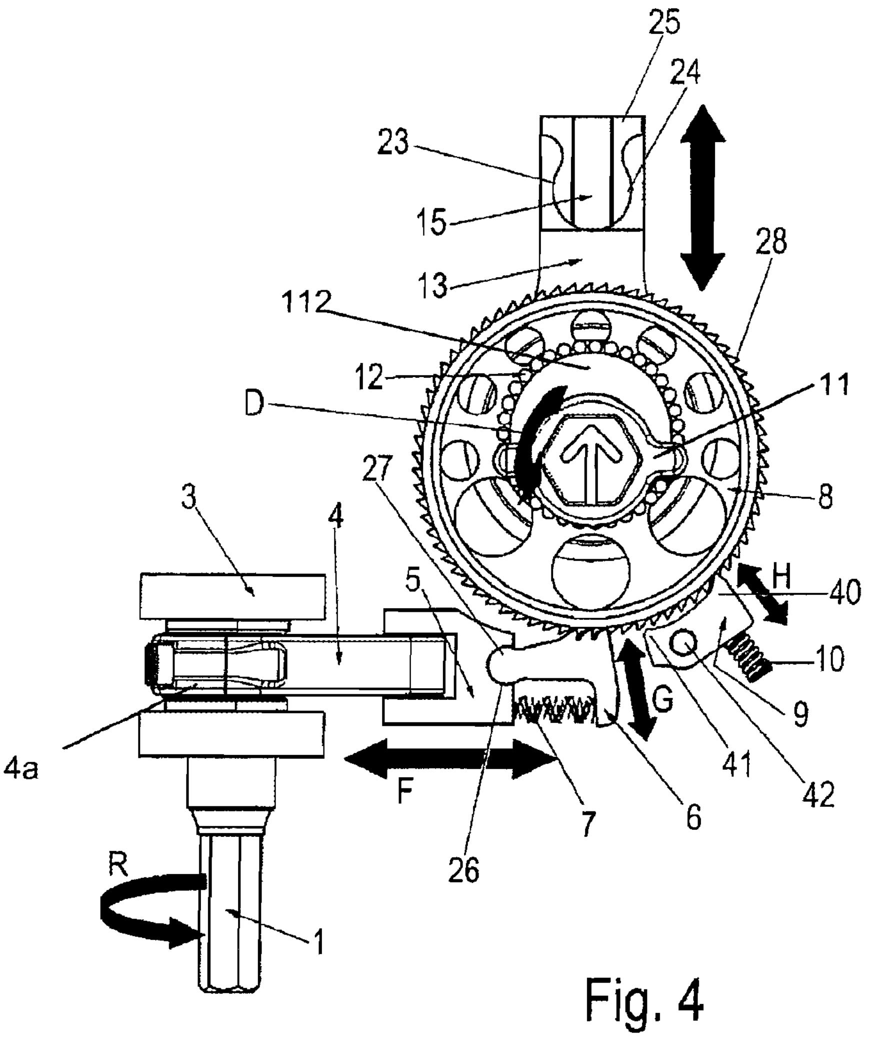
FIG. 4 is a detailed front elevation view of a first crank-arm-driven embodiment of the operating mechanism of FIG. 3.

Referring now to FIG. 3, the lower crimping die 19*b* is connected with the upper end of a crimping arm 16 that is connected for longitudinal movement relative to the housing H. The upper die 19*a* is supported in a stationary position relative to the housing by the vertical and horizontal support arms 17, 18 and 50, as described above. The lower end of the crimping arm is connected with a pressure member 15 that is connected with the upper end of an eyelet connecting rod 13 having at its lower end an integral eyelet portion 22. Alternatively, the crimping arm could be spring biased toward the open position. As shown in FIG. 4, the connecting rod eyelet portion 22 of connecting rod 13 is mounted on a tubular ball bearing race 12 which is rotatably supported on a circular disk 112 that is eccentrically arranged relative to a ratchet wheel 8 that is rotatably connected with the housing. The upper end of the connecting rod 13 contains a recess 23 that receives the protuberance portions 24 of the pressure member 15, which pressure member has a front surface 25 for engagement with the crimping arm 16. The ratchet wheel 8 is provided on its outer circumference with a set of ratchet teeth 28. The ratchet wheel 8 is rotated in a given direction in a step-by-step manner by a transport pawl 6 that is reciprocated (as shown by the arrow F) by the drive shaft 1 supported in ball bearings 3 via crank means 4*a*, crank arm 4, and slide member 5. The transport pawl 6 is pivotally connected with the slide member 5 by a tongue and groove connection 26, 27, and is biased by compression spring 7 (as shown by the arrow G) toward engagement with the ratchet teeth on ratchet wheel 8. Locking pawl 9 is pivotally connected with the housing by pivot pin 42, and is biased by spring 10 (as shown by the arrow H) toward engagement with the ratchet teeth 28, thereby to prevent rotation of the ratchet wheel in the opposite direction. Thus, rotation of the drive shaft 1 in the direction shown by the arrow R causes connecting rod 13 (and pressure member 15 and crimping arm 16) to be incrementally displaced in the crimping direction as a result of the reciprocatory movement of the transport pawl 6.

This locking catch mechanism is advantageous, especially with crimping large line cross-sections. During the crimping process due to the high pressing forces, tensions are built up in the drive mechanism. These tensions are suddenly "discharged" after connecting rods have gone beyond the upper dead center into the downward movement of the drive mechanism. As a result, eccentric wheel 8 is turned so far that the cable lug can no longer be taken out of the crimping insert 19. The locking catch mechanism of this crimping tool therefore, as described above, is so designed that fast rotary movements of eccentric wheel 8 are prevented and that the cable lug in the lower dead center of the drive mechanism can be taken out while the crimping insert 19 is fully opened.

The two crimping parts 19*a* and 19*b* are made with a semicircular shape, whereby in the crimping part edge forming the diameter of the semicircle, there is provided a recess that is used to receive the connector, terminal or lug T that is to be pressed onto the conductor C. In head part A, the two crimping parts 19*a* and 19*b* are assembled to form a circle with a central opening for the pickup of the cable lug or the cable connector. The first crimping part 19*a*, here with its circular circumference edge, lies in the horizontal die support member 18. The second crimping part 19*b*, with its circular edge, lies in a semicircular seat of an upper front of the crimping stamp 16.

Figure 7:
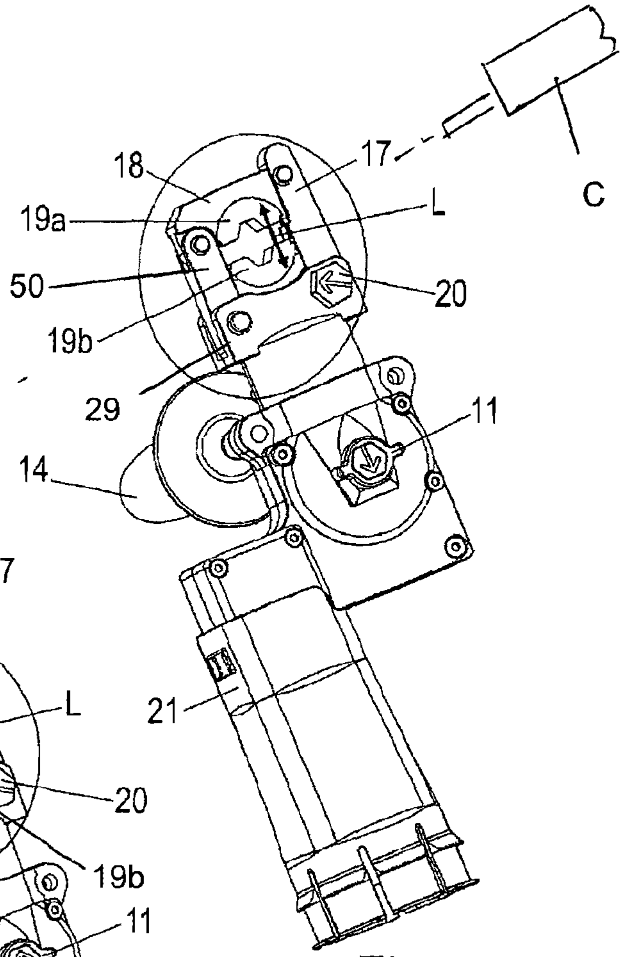
FIGS. 7 and 8 are front perspective views illustrating the operation of the crimping dies.
Figure 8:
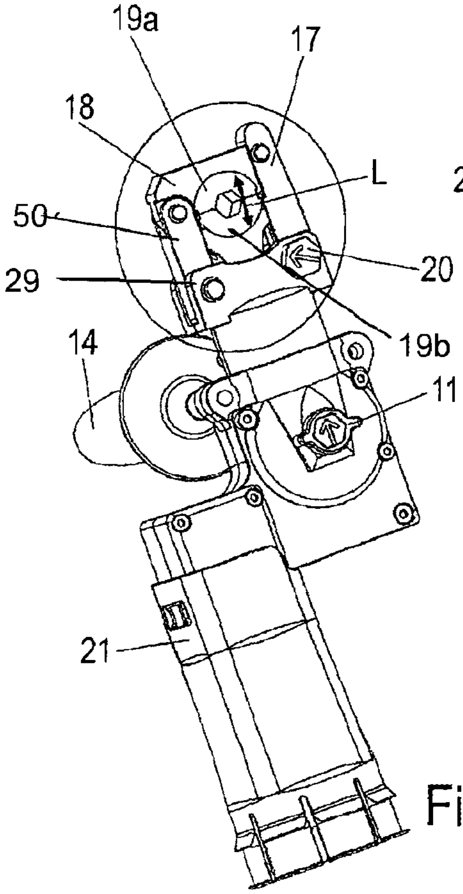

To crimp the cable lugs/cable connectors, the crimp insert is closed or opened via the mechanics of the crimping tool. The cable lug/cable connector, inserted between the two crimping parts 19*a* and 19*b*, as one can easily seen in FIGS. 7 and 8, is pressed upon a precisely defined path of by the upper movement of the lower crimping part 19*b*. The double arrow L here indicates the direction of motion of the crimping parts and of the crimping stamp 16 that brings this motion about.

Figures 6A, 6B, 6C:
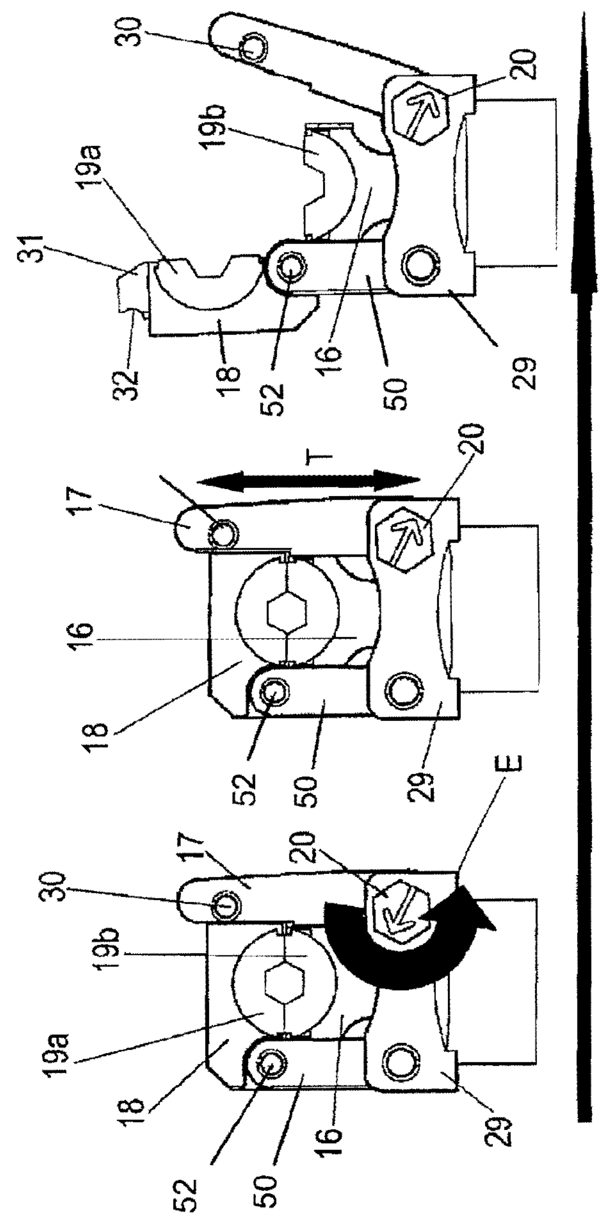
FIGS. 6*a*- 6*c* are detailed elevation views illustrating the manner of releasing the stationary crimping die from its normal crimping position.

According to an important feature of the invention shown in FIGS. 6*a*- 6*c*, manually operable release means 20 are provided for releasing the stationary upper crimping die for displacement toward an open position, thereby to permit removal of a faulty or jammed connector from the crimping apparatus. In a preferred manner, the two support arms 17 and 18 are releasably connected together. As shown in FIG. 6, support arm 17 has for this purpose a bolt 30 that points normal to the longitudinal axes of the support arms, grasping behind this bolt is a recess 32 contained in a projection 31 on the front of the first support arm 17 facing toward the second support arm 18. To unlock the support arms 17, 18, there is rotatably positioned on the first support arm 17 an eccentric bolt 20 that eccentrically upon a tool housing part 29 is rotatably positioned around a second pivotal point in such a manner that the first support arm 17 can be moved parallel to its longitudinal axis away from drive unit B. As a result, bolt 30 is lifted out of recess 32, and the first support arm 17 can be pivoted outwardly away from the second support member 18. Subsequently, the second support member 18 can be pivoted upwardly. In order simply to insert or take out a connector or terminal, for example, in case the tool has been handled falsely, such as when a cable lug that is too big is put into the crimping insert 19.

Accordingly, a head unit A, according to this design, can also be unlocked and opened when under load. For this purpose, eccentric bolt 20 must be turned, preferably by 180° counterclockwise, as a result of which, support arm 17 is moved upwardly and thus unlocked. Subsequently, one can pivot the support arms 17 and 18 away to the side and the erroneously inserted connector can be removed.

In a particular embodiment of the crimping tool, there is arranged on eccentric wheel 8 a manual actuation unit 11 for the manual turning of eccentric wheel 8. This manual actuation unit 11 is firmly connected with eccentric wheel 8 and in the embodiment shown by way of example in FIG. 3 has a head in the form of a hexagonal screw head upon which—on opposite sides of the circumference of the screw head—there are arranged noses which facilitate a turning action with the fingers of a user. An arrow on the front of the manual actuation unit 11 indicates the position of eccentric wheel 8 and thus also the advancement of a crimping process.

Preferably, there is shown on the front surface of eccentric bolt 20 an arrow that indicates whether support arm 17 is in the lowered closed or in the raised opened position. Arrow E in FIG. 6 here points to a preferred distribution direction of eccentric bolt 20. Double arrow T clearly shows the movement direction of pick-up strap 17 that is brought about by the turning of eccentric bolt 20.

The manually controlled crimping tool is particularly distinguished here by the fact that drive unit B has a drive shaft 1 that can be driven by an electric motor and that is rotatably positioned around its longitudinal axis. A first embodiment of drive unit B is shown in FIG. 3. Along with drive shaft 1, drive unit B has a transport catch 6 that can be moved alternately in a translational manner and which is in a working connection with an eccentric wheel 18, which drives the crimping arm 16. Eccentric wheel 18 in a preferred manner is made with ratchet teeth 28 located on the outside. On its side facing toward eccentric wheel 8, transport catch 6 is likewise provided with gearing so that the transport catch 6 with eccentric wheel 8 during a transport procedure will engage each other in a form-locking manner.

Figure 9:
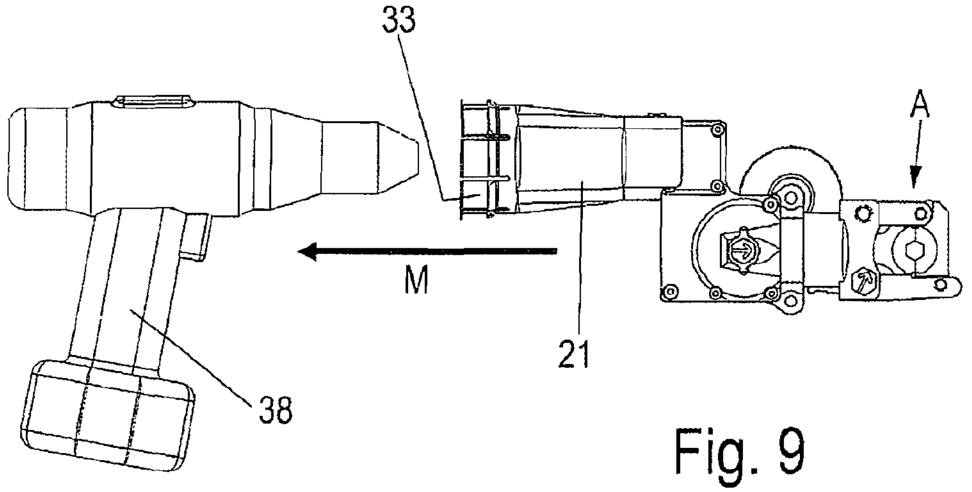
FIGS. 9 and 10 illustrate the manner of connection of the crimping tool to an electric drill.
Figure 10:
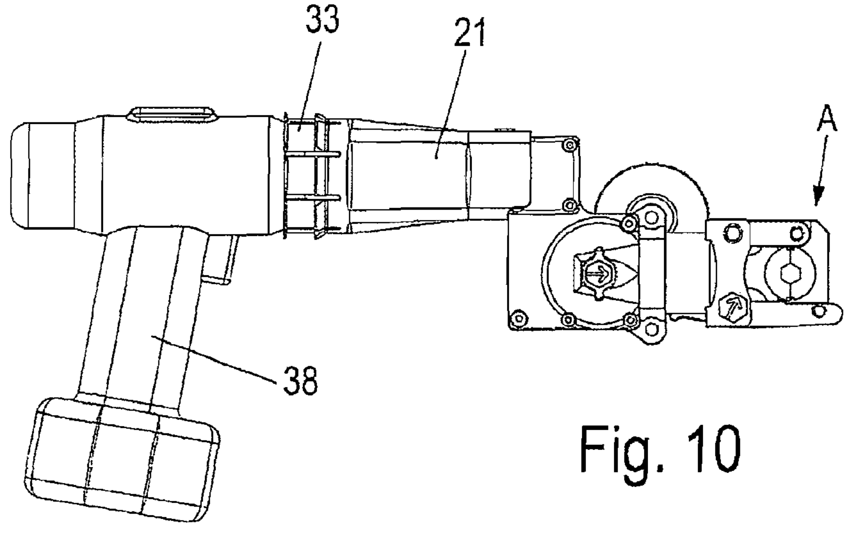

As shown in FIGS. 9 and 10, the crimping tool is preferably fashioned as a yoke for an electrically-driven or a battery-powered hand drill, whereby drive shaft 1 can be clamped separately into the drill chuck of the drill, or with the appropriate auxiliary adapter. In this case, to support the weight of the crimping tool against the drill axially with respect to drive shaft 1, there is arranged a support sleeve 21 around the drive shaft upon drive unit B. On its end facing away from the crimping tool, support sleeve 21 is made as a resilient clamping portion 33 for the purpose of firmly clamping the support sleeve 21 upon a drill/battery-powered drill 38. Upon the attachment of the crimping tool on the drill, support sleeve 21, together with the crimping tool, is pushed over the drill chuck of drill 38 and is clamped and secured on the drill, preferably by means of clamping clip (not shown) that presses the clamping parts 38 together. In a preferred embodiment, there is inserted into the drill chuck of the drill first of all an auxiliary drive sleeve adapter (not shown). While the support 21 and the crimp tool are pushed upon, we insert into this drive sleeve the drive shaft 1 so that, in this way, we can transport torque from the drill to the drive shaft 1.

Figure 5:
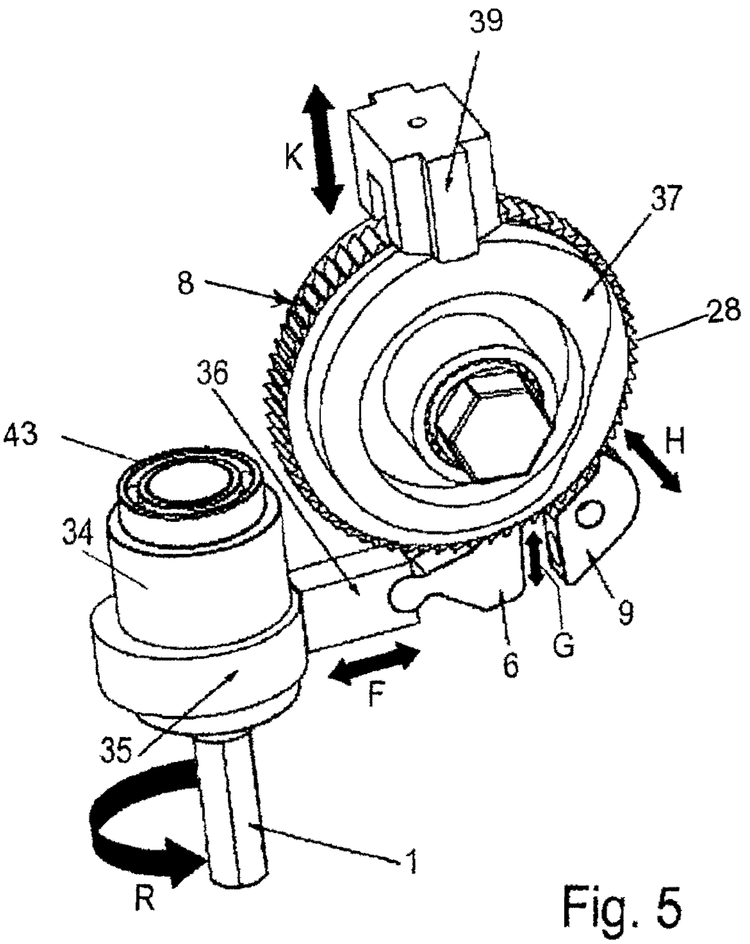
FIG. 5 is a detailed perspective view of a second cam-driven embodiment of the operating mechanism.

Two mechanisms are proposed for the translation of the drive moment from the drive shaft 1, which is clamped into the electric motor or into the drill chuck upon the transport catch 6. First of all, a crank drive arrangement has been described above with regard to the embodiment of FIGS. 3 and 4. A cam disk drive which will now be described in greater detail below with reference to FIG. 5.

In this alternate drive embodiment, drive unit B has a cam disc drive. Here again, an electric motor, for example, the electric motor of a drill, transmits the drive moment via the drill chuck upon drive shaft 1. Drive shaft 1 is here preferably made as a hexagonal unit so that a triple-cheek chuck of a drill can be clamped to the drive shaft, or an associated adapter. Drive shaft 1 is supported in drive unit B by means of a ball bearing, preferably a double ball bearing, and passes the rotary torque onto a cam roller 34. Arranged on this cam roller 34 is a cam disc 35, which rotates along with cam roller 34. Slide member 36 specifically here works along the functional principle of a centric slide, moves in a sliding manner as a cam follower over the outer edge of cam disc 35. In this way, the rotary movement of drive shaft 1 and cam disc 35 is converted into an alternating translation movement. Because cam disc 35—as drive shaft 1 rotates to the left or the right—displays differing gradients, the correct rotational direction is assured via a freewheel connection (not shown) in the interior of cam disc 35. Slide 36 converts the rotation movement into a translation movement and passes the latter on to transport pawl 6. In place of eccentric wheel 8, drive unit B here has a cam surface 37 that by means of the previously described ratchet mechanism is driven by the transport pawl analogous to the ratchet mechanism that works during the crank drive. The rotary movement of the cam surface 37 again is converted via a pressure member follower 39 into a translation movement, which is passed on to the crimp stamp 16. In this cam disc drive, it is advantageous that one can distribute the movement required for the crimping process most extensively to the circumference of the cam disc. In this way, the working stroke can be adjusted to the individual requirements.

Figure 11:
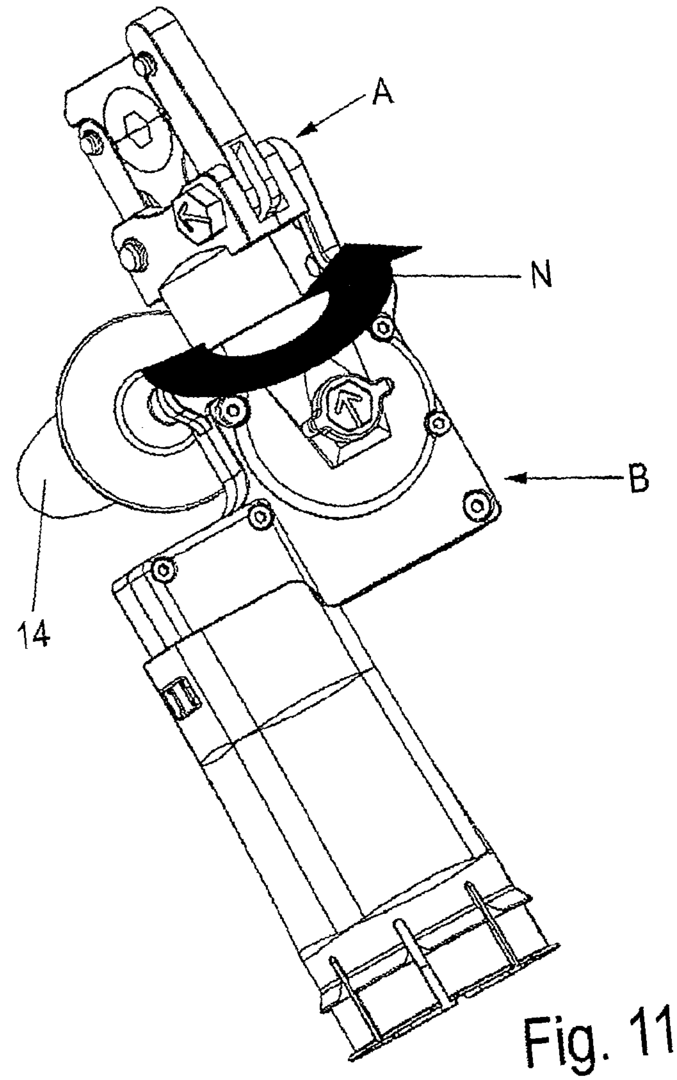
FIG. 11 illustrates the manner of rotation between the crimping tool and its support sleeve.

As shown in FIG. 11, head unit A in a particularly preferred embodiment is positioned with respect to drive unit B so that it can be rotated around the longitudinal axis of the crimping stamp 16, particularly by 360°, in order to simplify working in differing directions or when space is tight. As for the rotatable positioning of head unit A, particular preference is given to several latching positions in a particularly preferred manner at equal intervals.

While in accordance with the provisions of the Patent Statutes the preferred forms and embodiments of the invention have been illustrated and described, it will be apparent to those skilled in the art that changes may be made without deviating from the invention described above.

What is claimed is:

1. A crimping tool for crimping an electrical contact toward engagement with an electrical conductor, comprising:

(a) a housing (H);

(b) a pair of crimping dies (19*a*, 19*b*);

(c) die support means (17, 18, 19, 50) supporting a stationary first one of said crimping dies (19*a*) in a stationary position on said housing; and (d) displacing means for displacing a movable second one of said crimping dies (19*b*) between open and closed positions relative to said stationary crimping die, said crimping dies having adjacent faces containing opposed recesses that cooperate to define an opening for receiving the electrical contact when said movable crimping die is in said open position, and for crimping the contact on the conductor when said movable die is in said closed position, said displacing means including:

(1) a drive shaft (1) connected for rotation relative to said housing;

(2) a crimping arm (16) having a first end portion connected with said movable crimping die member, an intermediate portion connected for sliding movement reciprocatory displacement relative to said housing, and a second end portion; and (3) rotary-to-reciprocatory motion converting means arranged between said drive shaft and said crimping arm second end portion for transforming the rotary motion of said drive shaft to reciprocatory motion of said crimping arm, thereby to displace said movable crimping die between said open and closed positions.

2. The crimping tool as defined in claim 1, including a support sleeve (21) connected at one end with said housing, said support sleeve being adapted for connection with the operating end portion of an electric drill having chuck means connected with said drive shaft.

3. The crimping tool as defined in claim 2, wherein said housing is connected for rotation relative to said support sleeve.

4. The crimping tool as defined in claim 3, and further including a handle member (14) connected with said housing for rotatably adjusting the position of said housing relative to said support sleeve.

5. The crimping tool as defined in claim 1, wherein said rotary-to-reciprocatory motion converting means includes:

(a) a transport pawl (6) connected for reciprocatory movement relative to said housing;

(b) transport means (4*a*; 35) driven by said drive shaft (4*a*; 35) for reciprocating said transport pawl;

(c) a ratchet wheel (8) connected for rotation relative to said housing, said ratchet wheel having a circumferential set of ratchet teeth (28) arranged for engagement by said ratchet pawl, whereby said ratchet wheel is rotated in a give direction in a step-by-step manner by said transport pawl; and (d) eccentric means (112; 37) connected with said ratchet wheel for operating said crimping arm to displace said movable crimping die between said open and closed positions.

6. The crimping tool as defined in claim 5, wherein said transport means includes eccentric crank means (4*a*) driven by said drive shaft, and a crank arm (4) driven by said crank means.

7. The crimping tool as defined in claim 5, wherein said transport means includes a cam member (35) drive by said drive shaft, and a follower member (36) mounted for reciprocation relative to said housing, said follower member having a first end in engagement with the cam surface of said cam member, and a second end connected with said transport pawl.

8. The crimping tool as defined in claim 5, and further including locking pawl means (9) preventing rotational movement of said ratchet wheel in the opposite direction.

9. The crimping tool as defined in claim 5, and further including manual actuation means (11) for manually rotating said ratchet wheel relative to said housing.

10. The crimping tool as defined in claim 5, wherein said eccentric means comprises:

(a) an eccentric disk (112) mounted eccentrically on said ratchet wheel;

(b) an eyelet connecting rod (13) having at one end an annular eyelet portion (22) concentrically mounted on said eccentric disk, said eyelet connecting rod having a second end; and (3) a pressure member (15) connected with said eyelet connecting rod second end for connection with said crimping arm second end portion.

11. The crimping tool as defined in claim 10, and further including annular ball bearing means (12) supporting said connecting rod eyelet portion for rotation on said eccentric disk.

12. The crimping tool as defined in claim 11, wherein said eyelet connecting rod second end contains a slot (23) receiving said pressure member.

13. The crimping tool as defined in claim 5, wherein said eccentric means comprises:

(1) a cam member (37) mounted on said ratchet wheel, said cam member having an eccentric cam surface relative to the axis of rotation of said ratchet wheel; and (2) a cam follower pressure member (39) mounted for reciprocation relative to said housing, said cam follower pressure member having a first end in engagement with said cam surface, and a second end connected with said crimping member second end portion.

14. The crimping tool as defined in claim 5, and further including release means (20) for releasing said stationary crimping die support means to permit movement of said stationary die toward a released position relative to said housing.

15. The crimping tool as defined in claim 14, wherein said die support means comprises:

(1) a horizontal die holder member (18) having a pair of end portions;

(2) a fixed vertical support arm (50) extending upwardly from said housing;

(3) first pivot means (52) pivotally connecting one of said die holder end portions with the upper end of said fixed vertical support arm;

(4) a movable vertical support arm (17) extending upwardly from said housing, said movable support arm being connected at its lower end for vertical longitudinal displacement between lower locked and upper unlocked positions relative to said housing;

(5) latch means (30, 31, 32) for locking the die holder member other end to the upper end of said movable support arm when said movable support is in the lower locked position; and (6) manually operable release means (20) for displacing said movable support arm between said locked and unlocked positions relative to said housing.

16. The crimping tool as defined in claim 15, wherein said manually operable release means includes an eccentric cylindrical member rotatably connected with said housing, said movable vertical support member being pivotally connected at its lower end with said eccentric cylinder member.

* * * * *